(12) United States Patent
Peterson

(10) Patent No.: US 8,027,538 B1
(45) Date of Patent: *Sep. 27, 2011

(54) USER INTERFACE FOR HIGH DYNAMIC RANGE MERGE IMAGE SELECTION

(75) Inventor: John W. Peterson, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/701,488

(22) Filed: Feb. 5, 2010

Related U.S. Application Data

(63) Continuation of application No. 11/314,234, filed on Dec. 22, 2005, now Pat. No. 7,660,464.

(51) Int. Cl.
*G06K 9/00* (2006.01)
(52) U.S. Cl. .................. 382/181; 382/215; 700/223
(58) Field of Classification Search .................. 382/100, 382/181, 190, 191, 195, 199, 215, 224, 228
See application file for complete search history.

(56) References Cited

U.S. PATENT DOCUMENTS

| | | | |
|---|---|---|---|
| 4,057,338 A | 11/1977 | Yevick | |
| 5,185,808 A | 2/1993 | Cok | |
| 5,528,290 A | 6/1996 | Saund | |
| 5,657,096 A | 8/1997 | Lukacs | |
| 5,802,202 A | 9/1998 | Yamada et al. | |
| 5,838,837 A | 11/1998 | Hirosawa et al. | |
| 5,920,657 A | 7/1999 | Bender et al. | |
| 5,963,664 A | 10/1999 | Kumar et al. | |
| 5,986,668 A | 11/1999 | Szeliski et al. | |
| 5,987,164 A | 11/1999 | Szeliski et al. | |
| 6,005,545 A | 12/1999 | Nishida et al. | |
| 6,043,837 A | 3/2000 | Driscoll, Jr. et al. | |
| 6,075,905 A | 6/2000 | Herman et al. | |
| 6,078,701 A | 6/2000 | Hsu et al. | |
| 6,084,592 A | 7/2000 | Shum et al. | |
| 6,128,108 A | 10/2000 | Teo | |
| 6,246,413 B1 | 6/2001 | Teo | |
| 6,249,616 B1 | 6/2001 | Hashimoto | |
| 6,356,297 B1 | 3/2002 | Cheng et al. | |

(Continued)

FOREIGN PATENT DOCUMENTS

WO WO 98/02844 1/1998

(Continued)

OTHER PUBLICATIONS

Bergen et al., "A Three Frame Algorithm for Estimating Two-Component Image Motion", IEEE Transactions on Pattern Analysis and Machine Intelligence vol. 14 No. 9 (Sep. 1992), 24 pages.

(Continued)

*Primary Examiner* — Anand Bhatnagar
(74) *Attorney, Agent, or Firm* — Fish & Richardson P.C.

(57) ABSTRACT

Methods and apparatus, including systems and computer program products, for creating high dynamic range images. One method includes actions of establishing a current set of digital image; displaying a high dynamic range image and information identifying the current set of images, the high dynamic range image being computed from the current set of images; and repeatedly, as long as the user provides user input changing the current set of images, receiving user input changing the current set of images and in response to each user input displaying a high dynamic range image and information identifying the current set of images, where the high dynamic range image is computed from the current set of images.

24 Claims, 2 Drawing Sheets

U.S. PATENT DOCUMENTS

| | | | |
|---|---|---|---|
| 6,385,349 B1 | 5/2002 | Teo | |
| 6,389,179 B1 | 5/2002 | Katayama | |
| 6,411,742 B1 | 6/2002 | Peterson | |
| 6,424,351 B1 | 7/2002 | Bishop et al. | |
| 6,532,036 B1 | 3/2003 | Peleg et al. | |
| 6,535,650 B1* | 3/2003 | Poulo et al. | 382/284 |
| 6,567,085 B1 | 5/2003 | Edmark | |
| 6,597,468 B1* | 7/2003 | Inuiya | 358/1.15 |
| 6,618,511 B1 | 9/2003 | Mancuso et al. | |
| 6,643,413 B1 | 11/2003 | Shum et al. | |
| 6,646,246 B1* | 11/2003 | Gindele et al. | 250/208.1 |
| 6,674,484 B1 | 1/2004 | Boland et al. | |
| 6,704,041 B2 | 3/2004 | Katayama | |
| 6,714,689 B1 | 3/2004 | Yano et al. | |
| 6,778,207 B1 | 8/2004 | Lee et al. | |
| 6,909,459 B2* | 6/2005 | Watson et al. | 348/229.1 |
| 7,006,707 B2 | 2/2006 | Peterson | |
| 7,239,805 B2* | 7/2007 | Uyttendaele et al. | 396/222 |
| 7,660,464 B1* | 2/2010 | Peterson | 382/181 |
| 2002/0181802 A1 | 12/2002 | Peterson | |
| 2004/0246271 A1 | 12/2004 | Georgiev et al. | |

FOREIGN PATENT DOCUMENTS

| | | |
|---|---|---|
| WO | WO 01/88838 | 11/2001 |

OTHER PUBLICATIONS

Brown et al. "Recognising Panoramas," Ninth IEEE International Conference on Computer Vision (ICCV'03)—vol. 2, 2003, 8 pages.

Burt, et al. "A Multiresolution Spline With Application to Image Mosaics", ACM Transactions on Graphics, vol. 2, No. 4, Oct. 1983, pp. 217-236.

Debevec, et al. "Recovering High Dynamic Range Radiance Maps from Photographs", SIGGRAPH 97, Aug. 1997 10 pages.

Girod, et al. "Direct Estimation of Displacement Histograms", OSA Meeting on Image Understanding and Machine Vision, Cape Cod, MA, Jun. 1989, pp. 1-4.

Paul S. Heckbert, "Fundamentals of Texture Mapping and Image Warping". *Master's Thesis* under the direction of Carlo Sëquin, Dept. of Electrical Engineering and Computer Science, University of California, Berkeley, California, Jun. 17, 1989, 89 pages.

Klette et al., "Computer Vision. Three-Dimensional Data from Images", Springer-Verlag Singapore Pte. Ltd. 1998, pp. 48-56.

Mann, et al., "Virtual Bellows: Constructing High Quality Stills from Video", M.I.T. Media Laboratory Perceptual Computing Section Technical Report No. 259 Appears, Proc. First IEEE Int. Conf. On Image Proc., Austin, TX, Nov. 1994, pp. 1-5.

Porter, et al. "Compositing Digital Images", Computer Graphics, vol. 18, No. 3, Jul. 1984, pp. 253-259.

Shum et al., "Rendering with Concentric Mosaics," (1999) Microsoft Research, pp. 299-306.

"Stitcher—High Resolution Panoramas—for Professionals Only!" http://www.realviz.com/products/stitcher/index.htm, REALVIZ, S.A. Jun. 15, 2000 (3 Pages).

"Stitcher—Key Features" http://www.realviz.com/products/stitcher/mainfeatures.htm, REALVIZ, S.A. Jun. 15, 2000 (3 Pages).

"Stitcher—Major Features and Benefits" http://www.realviz.com/products/stitcher/majorfeatures.htm, REALVIZ, S.A. Jun. 15, 2000 (2 Pages).

"Stitcher—Success Stories" http://www.realviz.com/products/stitcher/success.htm. REALVIZ, S.A. Jun. 15, 2000 (1 Page).

Szeliski et al., Creating Full View Panoramic Image Mosaics and Environment Maps, Proceedings of the 24th annual conference on Computer graphics and interactive techniques, 1997, 8 pages.

Greg Ward, "Fast, Robust Image Registration for Compositing High Dynamic Range Photographs from Handheld Exposures", Journal of Graphics Tools, vol. 8, No. 2, 2003, pp. 17-30.

Lance Williams, "Pyramidal Parametrics", Computer Graphics, vol. 17, No. 3, Jul. 1983, pp. 1-11.

Xiong, et al. "Registration, Calibration and Blending in Creating High Quality Panoramas", Applications of Computer Vision, Proceedings of the Fourth IEEE Workshop, Los Alamitos, CA Oct. 19-21, 1998, pp. 69-74.

* cited by examiner

USER INTERFACE FOR HIGH DYNAMIC RANGE MERGE IMAGE SELECTION

CROSS-REFERENCE TO RELATED APPLICATIONS

This application is a continuation application of and claims priority to U.S. application Ser. No. 11/314,234, filed on Dec. 22, 2005, now U.S. Pat. No. 7,660,464.

BACKGROUND

This invention relates to high dynamic range image creation.

When taking photographs, cameras have limited dynamic range—that is, the photographer must choose the range of radiance values of interest and select the exposure time to optimally capture colors in that range. For example, a very short exposure time is required to capture the brightness of a sunlit portion of a scene, but may leave the other portions under-exposed. However, a longer exposure may saturate the film. To capture the full dynamic range in such a scene, a photographer can take a series of photographs with different exposures. These can then be combined into a single high dynamic range ("HDR") image which includes the full range of radiance values found in the scene. An HDR image refers to an image with pixel values with floating point values having no specific upper value limit, unlike traditional digital images with pixel values limited by a particular bit depth.

Processes for creating HDR images require that all of the images of the scene input to the process are aligned pixel by pixel. For example, the contents of the image in the pixel at location (10, 52) in image 1 must align to the contents of the image 2 at location (10, 52) in image 2. When a camera is fixed, for example, by attaching it to a tripod, the resulting photographs can be expected to be perfectly aligned. However, photos may not be aligned if, for example, the camera is hand-held or otherwise not stationary. If a series of images are not aligned, computer methods can be used to align them prior to using them to create the HDR image, in a process called registration. Many processes exist for registration of multiple images.

Although these processes perform their best possible alignment of the input images, they may fail to align one or more of the images. In particular, it is often not possible to register an image that contains a moving object that is not visible in the other images. In any event, the HDR image created from the supposedly registered image will be partly distorted because some pixels will contain data from other points in the scene or from unwanted moving objects.

SUMMARY

In general, in one aspect, the invention provides methods and apparatus, including computer program products, implementing techniques for providing a user interface for high dynamic range merge image selection. The techniques include establishing a current set of images, each of the images in the current set being a digital image; displaying a high dynamic range image and information identifying the current set of images, the high dynamic range image being computed from the current set of images; and repeatedly, as long as the user provides user input changing the current set of images: receiving user input changing the current set of images; and in response to each user input changing the current set of images displaying a high dynamic range image and information identifying the current set of images, the high dynamic range image being computed from the current set of images.

The technique for establishing a current set of images can include receiving a source set of images, registering the images in the source set to generate a set of registered images, and establishing the set of registered images as the current set of images.

The information identifying the current set of images can include a thumbnail of each of the images in the current set. With such information, the techniques can further include displaying for each image in the current set an indication of confidence in the registration of the respective image in the set of registered images; displaying for each image in the current set an indication of the exposure parameters of the image; and the user input changing the current set of images is received as a toggle of a checkbox on a graphical user interface display.

The techniques can also include displaying a histogram showing a radiance range for each high dynamic range image.

The techniques can also include performing registration of the current set of images before computing the first high dynamic range image, including determining a registration confidence value for each of the images in the current set; and displaying an indication that a first image from the current set has a low registration confidence value.

The invention can be implemented to realize one or more of the following advantages. Users can refine an HDR image by adding or removing photos from those merged to create the HDR image. Users can view results of creating an HDR image and interactively select which merged photos should contribute to the HDR image. The images merged to create the HDR image can be changed without the need to resubmit all of the images to the process. A problematic image can be removed from the HDR result without resubmitting all the other images to the process. A new image can be added without resubmitting all the images already contributing to the HDR image. A determination can be made that an additional image with a particular range of radiance values is required to create the HDR image.

Users can be provided with information to aid in adding or removing images from the set of those contributing to an HDR result. Such information can include a histogram of the HDR result, the relative exposure of each merged photo, an indication that the a merged image may have problems aligning with the other images, or an indication that a merged image may have a moving object preventing its registration with other images.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In one implementation of the invention, a computer program application for creating high dynamic range images (the "HDR merge application", or simply the "application") provides an interactive user interface that allows a user to quickly select and de-select photos to be combined into an HDR image. The photos are selected from an original or source set of photos, which generally will be provided by or identified by the user. The application provides a representation of each photo to the user in the user interface. The application provides a method for selection and de-selection of each of the images. The application can also provide other information that may be helpful to the user in selecting images for selection and de-selection.

Figure 1:
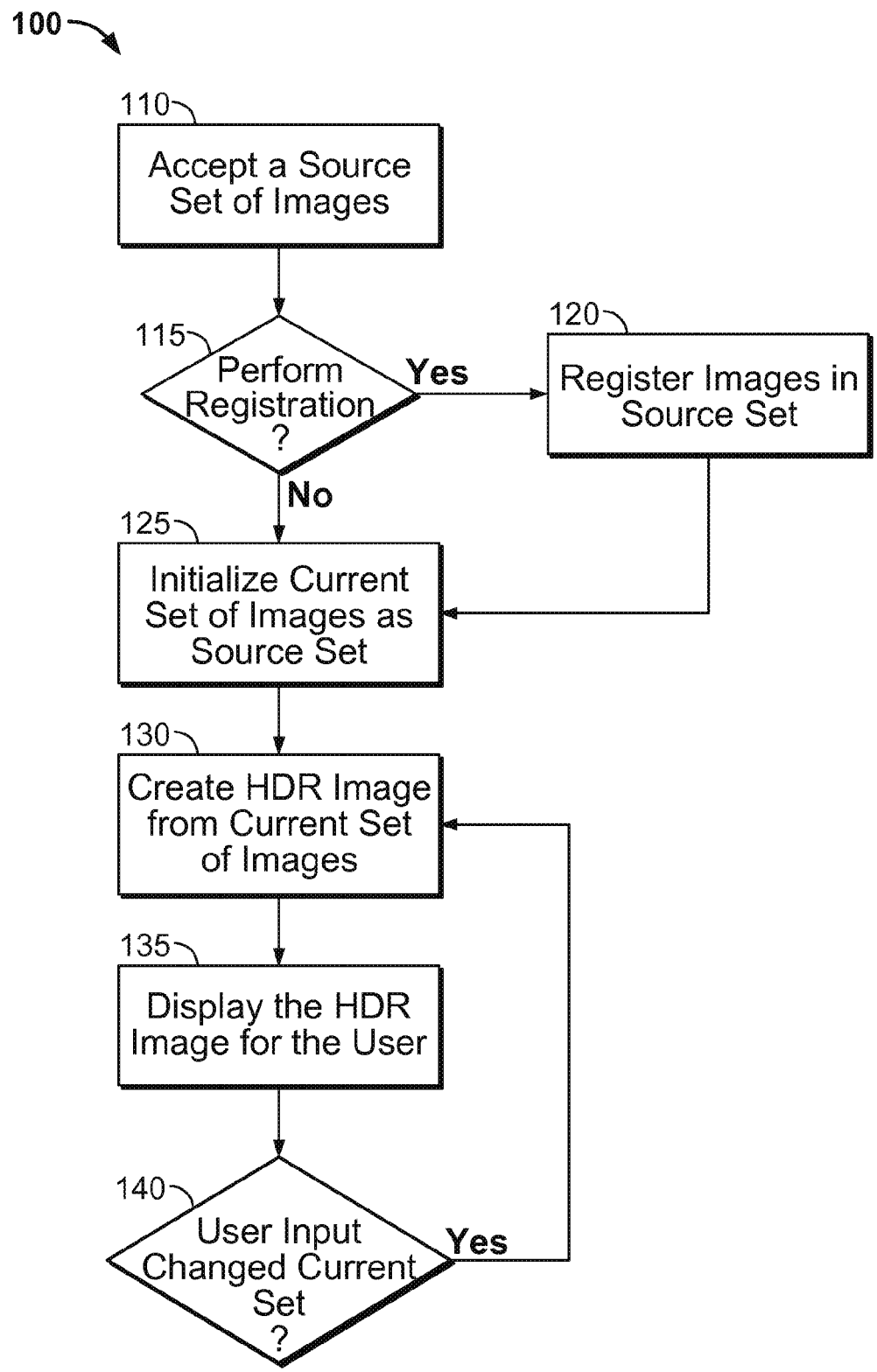
FIG. 1 is a flow chart showing a process for image selection for creating HDR images.

As shown in FIG. 1, the application implements a process 100 to allow interactive selection of images to be combined into an HDR image. Process 100 accepts an original or source set of digital images (step 110). Generally, the source set will be provided to the application by a user of the application and will include all the images that the user is interested in merging to create an HDR image. The images may, for example, be input to the application over a direct link from a digital camera. Alternatively, images may be uploaded from stored images on a computer hard drive to the application, or from any other image storage device, however connected or coupled to the computer running the application. Note that the application need not be implemented on a computer separate from the image capture. It may be executed, and the process 100 performed, by an embedded computer in a digital camera, for example, and it can be performed while images are being captured.

The process 100 then determines whether registration should be performed (step 115). Process 100 may skip this step, either always requiring registration or never providing registration, after accepting a source set of images. Alternatively, the process 100 can determine whether or not to perform registration based on characteristics of the source set of images such as their respective source, size, or exposure value ("EV"), and so on. Alternatively, whether or not to perform registration can be a user-selectable option.

Once the process determines that registration should be performed, it registers the images in the source set (step 120). Registration may be performed using any of the variety of techniques known in the art. For example, the process may apply a translational registration algorithm, for example, that described in "Direct Estimation of Displacement Histograms," Girod and Kuo, GSA Meeting on Image Understanding and Machine Vision, 1980. The process may alternatively apply other registration methods such as that described by Greg Ward in "Fast, Robust Image Registration for Compositing High Dynamic Range Photographs from Handheld Exposures," Journal of Graphics Tools, 8(2):17-30, 2003. In one implementation, the process uses a feature matching technique based on Scale Invariant Feature Transform (SIFT) features of the source set of images, analyzing the source image pixels to identify features which are geometrically invariant under similarity transforms and invariant under affine changes in intensity. Performing alignment using SIFT features is discussed, for example, in Brown and D. G. Lowe, Recognising Panoramas, in Proceedings of the 9th International Conference on Computer Vision (ICCV2003), pages 1218-1225, Nice, France, 2003. Once registration is completed, images in the source set of images may have been translated, rotated, or scaled from their original form to achieve proper alignment.

Whether or not registration is performed on the source set of images, the process 100 initializes a set of images, which will be referred to as the current set of images, which is initially made the same as the source set of images (step 125). This can be implemented in a variety of ways, including simply identifying images as being in or not being in the current set. Process 100 creates an HDR image from the current set of images (step 130). The creation of an HDR image may be implemented using any of a variety of known techniques.

In one implementation, the HDR image is created using techniques described in Debevec and Malik, "Recovering High Dynamic Radiance Maps from Photographs," Computer Graphics, ACM, 1997 (the "Debevec/Malik process"). In order to map from a set of separate photographs into a single high dynamic range image, the Debevec/Malik process determines a response function representing a mapping from actual scene radiance to pixel values in the photographs. The pixel values will only represent values within the camera's output range, while the scene may contain radiance values outside this range. The response function is recovered using only the set of photographs and knowledge of their varying exposure times. The Debevec/Malik process then uses this response function to convert pixel values in the photographs to relative radiance values. These relative radiance values for each photograph are then combined into the HDR image for the set of photographs.

In combining photographs, the Debevec/Malik process applies a "weight" to the pixel values of each image in the current set such that pixels within the middle of the camera sensor's valid output range contribute more to the resulting pixel value than pixels that are either very dark or very light. When each pixel has at least one image with data for that pixel near the middle of the camera's sensor range, the Debevec/Malik process provides a meaningful output. However, a very dark or very bright spot on the images produces a spot with either zero or full brightness output pixels in all the source images. In this case, the Debevec/Malik process produces no useful data because the weighting ignores the contribution of these images. One implementation handles this condition by applying a special method to deal with the very bright or dark spots on the images. This method checks the variance of each pixel from its mean value among all current images. If the variance is very small (which happens in the very dark/very light cases) then a single pixel value is selected from the darkest or lightest image and the response curve is applied to that value.

The application displays the resulting HDR image for the user (step 135). The application also provides a display from which the user can change the current set by adding or removing images from it. The user will remove images from the current set that the user wants to remove from inclusion in the displayed HDR image. Similarly, the user will add images to the current set that the user wants added to the images used to create the displayed HDR image. In one implementation, a user may add an image from the source set that was previously removed from the current set. In an alternative implementation, the user can add entirely new images, including images not previously registered, and optionally register them with the original registered source set.

If the application receives a user input changing the current set (step 140), the process 100 again creates an HDR image from the current set of images 130. The current set of images will include the user changes received by the application in step 140. In a preferred embodiment, creating an HDR image from a current set of images does not require reapplying the entire HDR image creation algorithms, if the same images in the current set of images has already been used to compute an HDR image.

In one implementation, additional information is provided to aid the user in selecting images to add to or remove from the current set. One type of useful information is information regarding the likelihood that one or more source images was not adequately registered with the other source images. For example, the translational registration algorithm to align a set of images while also deriving confidence values for each image is described in U.S. patent application Ser. No. 09/657, 949, "Merging Images to Form a Panoramic Image," filed Sep. 8, 2000, which is incorporated by reference, can align a set of images while also deriving confidence values for each image representing a confidence that each respective image was properly registered. The confidence information can be provided by displaying an indication to the user identifying images with low confidence of proper registration. The threshold for low confidence can be a preset value, or it can be set as a user option. The user may wish to remove such images from the current set.

Another type of useful information is information regarding the relative exposure of the images. This information can be derived from camera meta-information typically stored with each image in most standard camera formats that provides information about how the photograph was taken. The data may include parameters such as the f-stop (aperture), the exposure time, and the ISO (sensitivity) settings. For example, for JPEG files, the meta-data is stored as a special set of image tags collectively referred to as "EXIF" data. In one implementation, when the process 100 accepts the source set of images, the metadata for each image in the source set is included in the data accepted by the process. In one implementation, the relative exposure, or "EV" value, of each image is computed using the f-Stop, exposure, time, and ISO sensitivity settings for each image and displayed to the user to aid the user in adding and removing images from the current set. In one implementation, the EV is calculated using the following formula:

$$EV = \log_2(\text{ISO value}) + \log_2(\text{exposure time}) + (\log(64*\text{sqrt}(2))/\log(\text{sqrt}(2)) - \log(\text{aperture})/\log(\text{sqrt}(2)))$$

This formula results in an EV that is a dimensionless value used to indicate relative exposure on a log 2 scale—a photo exposed with an EV of 2.0 is exposed to twice as much light as one exposed with an EV of 1.0.

Figure 2:
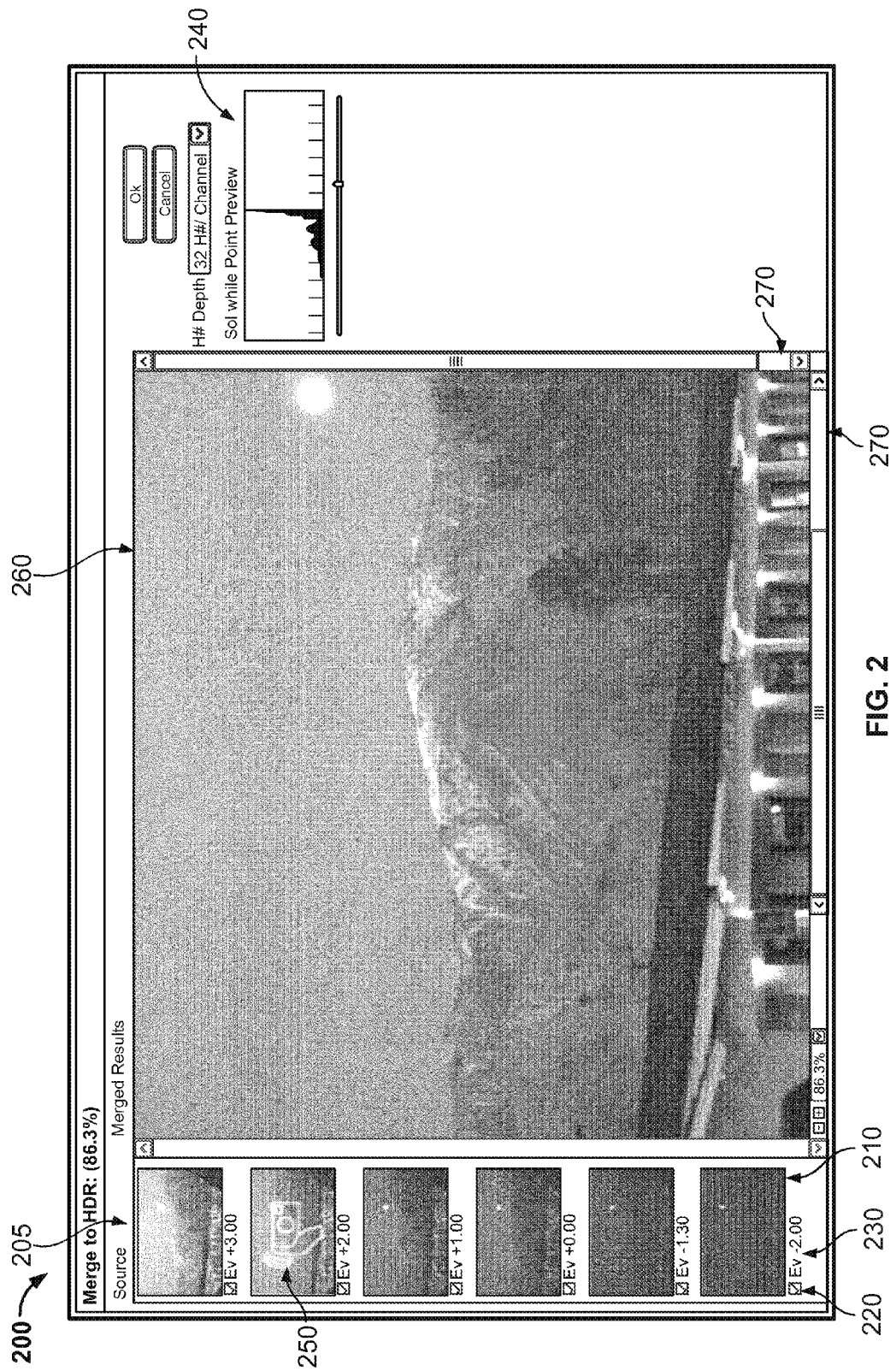
FIG. 2 is an illustrative screen shot of a user interface display produced by one implementation of an HDR merge application.

FIG. 2 illustrates many of these features in an illustrative screen shot 200 of a user interface display produced by one implementation of an HDR merge application. The screen shot 200 includes a display 260 of the HDR image created using the current set of images. The calculated HDR image contains floating point value pixel values; however, the displayed image 260 is clamped to the dynamic range of the monitor, in this case, an 8 bit monitor. The screen shot 200 also includes a histogram of the HDR result 240 and slide controls 270 determining the position of the HDR image in the application's window.

The screen shot 200 also shows user interface elements along the left column 205, with which a user may make selections of images to add or remove from the current set used to calculate the displayed HDR image. The column 205 includes a thumbnail image 210, or reduced size version, of each image in the source set, as a representation of the image used to calculate the HDR image. The column 205 also includes the EV value 230 for each source image. The EV value 230 represents the relative exposure of its associated image 210 and is computed from the f-Stop, exposure time, and ISO sensitivity settings stored in each source image's EXIF data.

The screen shot includes a "shaking camera" icon 250 overlaid on one of the thumbnail images. The "shaking camera" icon 250 indicates to the user that the application detects that the overlaid image in the current set may be causing problems in computing the HDR image. The "shaking camera" icon 250 is overlaid on each image for which the application detects such a problem. In one implementation, the application detects that an image in the current set is causing problems when it computes a low confidence value that the respective image was properly registered with other images in the current set.

The column 205 also includes a checkbox 220 for each source image. By clearing a checkbox 220, the associated image 210 is immediately removed from the current set of images and a new HDR image is recalculated and displayed as image 260. By checking a checkbox 220, the associated image 210 is immediately added to the current set of images and a new HDR image is recalculated and displayed as image 260. This interface permits users to quickly toggle a particular image on and off to gauge the image's impact on the calculated HDR image.

In implementing such toggling, it is advantageous to reuse previously computed information regarding the creation of the HDR image to prevent recomputation each time a checkbox is toggled. In one implementation using the Debevec/Malik process, the camera response curve for the set of images is computed only when an HDR image has not been created previously using the same combination of images in the current set. When a new combination of images makes up the current set, the curve is computed and stored in a cache along with an indication of which images were used to calculate the curve. The indication can be a binary code formed such that the value of each digit, 0 or 1, indicates whether a particular source image is in the current set or not. If an HDR image for the same set of images is again required, the code for the combination of images is found in the cache and the associated camera response curve is used to create the HDR image. Only if a new combination is received will a new camera response curve be calculated.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable device, e.g., a machine-readable storage device, storage medium, or memory device, or multiple ones of them; or it can be a tangible machine-readable propagated signal. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a camera, a video recorder, a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

For example, the invention could be implemented by way of computer program or embedded application directly on a digital camera. In one implementation, photos are taken directly on a digital camera. As the photos are taken or after they are taken, the camera registers the source set of images to be merged into an HDR image. In one implementation, the user is presented with thumbnail images of each source image directly on the digital camera, from which an image can be removed or added. In another implementation, the camera displays the calculated HDR image. The user then presses an "edit" button to edit the list of source files creating the image. The user presses another button to cycle through the images in the current set. While cycling through the images, the user may press a "delete" button to remove an image from the current set. The user may also add an image to the current set by taking another photo. In any digital camera implementation, the camera may provide the user with information to aid in selecting which image to add or remove.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Particular embodiments of the invention have been described. Other embodiments are within the scope of the following claims. For example, the steps recited in the claims can be performed in a different order and still achieve desirable results.

What is claimed is:

1. A computer-implemented method, comprising:
    establishing a current set of images, the current set of images including a plurality of digital images;
    displaying, using one or more computing devices, a first high dynamic range image and information identifying the current set of images, the first high dynamic range image being computed from the current set of images; and
    receiving a first user input changing the current set of images, where changing the current set of images includes at least one of adding or removing an image; and
    in response to the first user input changing the current set of images displaying a second high dynamic range image and information identifying the current set of images, the second high dynamic range image being computed from the current set of images.

2. The method of claim 1, further comprising:
    receiving a second user input changing the current set of images, where changing the current set of images includes at least one of adding or removing an image; and
    in response to the second user input changing the current set of images displaying a third high dynamic range image and information identifying the current set of images, the third high dynamic range image being computed from the current set of images.

3. The method of claim 1, where:
    establishing a current set of images comprises receiving a source set of images, registering the images in the source set to generate a set of registered images, and establishing the set of registered images as the current set of images.

4. The method of claim 1, where the information identifying the current set of images comprises a thumbnail of each of the images in the current set, and the user input changing the current set of images is received as a toggle of a checkbox on a graphical user interface display, the method further comprising:
    displaying for each image in the current set an indication of confidence in the registration of the respective image in the set of registered images.

5. The method of claim 4, where the confidence for an image indicates an alignment of the image relative to one or more other images of the current set of images.

6. The method of claim 1, where the information identifying the current set of images comprises a thumbnail of each of the images in the current set, and the user input changing the current set of images is received as a toggle of a checkbox on a graphical user interface display, the method further comprising:
    displaying for each image in the current set an indication of the exposure parameters of the image.

7. The method of claim 1, further comprising:
performing registration of the current set of images before computing the first high dynamic range image, including determining a registration confidence value for each of the images in the current set; and
displaying an indication that a first image from the current set has a low registration confidence value.

8. The method of claim 7, where the indication is displayed when the confidence value is below a specified threshold value.

9. A computer program product, encoded on a machine-readable storage device, comprising instructions operable to be executed by data processing apparatus to perform operations comprising:
establishing a current set of images, the current set of images including a plurality of digital images;
displaying a first high dynamic range image and information identifying the current set of images, the first high dynamic range image being computed from the current set of images; and
receiving a first user input changing the current set of images, where changing the current set of images includes at least one of adding or removing an image; and
in response to the first user input changing the current set of images displaying a second high dynamic range image and information identifying the current set of images, the second high dynamic range image being computed from the current set of images.

10. The computer program product of claim 9, further operable to perform operations comprising:
receiving a second user input changing the current set of images, where changing the current set of images includes at least one of adding or removing an image; and
in response to the second user input changing the current set of images displaying a third high dynamic range image and information identifying the current set of images, the third high dynamic range image being computed from the current set of images.

11. The computer program product of claim 9, where:
establishing a current set of images comprises receiving a source set of images, registering the images in the source set to generate a set of registered images, and establishing the set of registered images as the current set of images.

12. The computer program product of claim 9, where the information identifying the current set of images comprises a thumbnail of each of the images in the current set, and the user input changing the current set of images is received as a toggle of a checkbox on a graphical user interface display, the product further comprising instructions operable to be executed by data processing apparatus to perform operations comprising:
displaying for each image in the current set an indication of confidence in the registration of the respective image in the set of registered images.

13. The computer program product of claim 12, where the confidence for an image indicates an alignment of the image relative to one or more other images of the current set of images.

14. The computer program product of claim 9, where the information identifying the current set of images comprises a thumbnail of each of the images in the current set, and the user input changing the current set of images is received as a toggle of a checkbox on a graphical user interface display, the product further comprising instructions operable to be executed by data processing apparatus to perform operations comprising:
displaying for each image in the current set an indication of the exposure parameters of the image.

15. The computer program product of claim 9, further comprising instructions operable to be executed by data processing apparatus to perform operations comprising:
performing registration of the current set of images before computing the first high dynamic range image, including determining a registration confidence value for each of the images in the current set; and
displaying an indication that a first image from the current set has a low registration confidence value.

16. The computer program product of claim 15, where the indication is displayed when the confidence value is below a specified threshold value.

17. A system, comprising:
one or more processors configured to interact with a computer-readable medium in order to perform operations comprising:
establishing a current set of images, the current set of images including a plurality of digital images;
displaying a first high dynamic range image and information identifying the current set of images, the first high dynamic range image being computed from the current set of images; and
receiving a first user input changing the current set of images, where changing the current set of images includes at least one of adding or removing an image; and
in response to the first user input changing the current set of images displaying a second high dynamic range image and information identifying the current set of images, the second high dynamic range image being computed from the current set of images.

18. The system of claim 17, further configured to perform operations comprising:
receiving a second user input changing the current set of images, where changing the current set of images includes at least one of adding or removing an image; and
in response to the second user input changing the current set of images displaying a third high dynamic range image and information identifying the current set of images, the third high dynamic range image being computed from the current set of images.

19. The system of claim 17, where:
establishing a current set of images includes receiving a source set of images, registering the images in the source set to generate a set of registered images, and establishing the set of registered images as the current set of images.

20. The system of claim 17, where the information identifying the current set of images comprises a thumbnail of each of the images in the current set, and the user input changing the current set of images is received as a toggle of a checkbox on a graphical user interface display, the system further operable to perform operations comprising:
displaying for each image in the current set an indication of confidence in the registration of the respective image in the set of registered images.

21. The system of claim 20, where the confidence for an image indicates an alignment of the image relative to one or more other images of the current set of images.

22. The system of claim 17, where the information identifying the current set of images comprises a thumbnail of each of the images in the current set, and the user input changing the current set of images is received as a toggle of a checkbox on a graphical user interface display, the system further operable to perform operations comprising:

displaying for each image in the current set an indication of the exposure parameters of the image.

23. The system of claim 17, further operable to perform operations comprising:

performing registration of the current set of images before computing the first high dynamic range image, including determining a registration confidence value for each of the images in the current set; and displaying an indication that a first image from the current set has a low registration confidence value.

24. The system of claim 23, where the indication is displayed when the confidence value is below a specified threshold value.

* * * * *